(12) United States Patent
Bryan et al.

(10) Patent No.: US 10,509,649 B2
(45) Date of Patent: Dec. 17, 2019

(54) VALUE STREAM GRAPHS ACROSS HETEROGENEOUS SOFTWARE DEVELOPMENT PLATFORMS

(71) Applicant: TaskTop Technologies, Incorporated, Vancouver (CA)

(72) Inventors: J. Nicole Bryan, Austin, TX (US); Robert D. Elves, North Vancouver (CA); Mik Kersten, Vancouver (CA); Gail C. Murphy, Vancouver (CA)

(73) Assignee: TASKTOP TECHNOLOGIES, INCORPORATED, Vancouver (CA)

( * ) Notice: Subject to any disclaimer, the term of this patent is extended or adjusted under 35 U.S.C. 154(b) by 193 days.

(21) Appl. No.: 15/830,633

(22) Filed: Dec. 4, 2017

(65) Prior Publication Data

US 2019/0171446 A1    Jun. 6, 2019

(51) Int. Cl.
  *G06F 9/44* (2018.01)
  *G06F 8/77* (2018.01)
  *G06F 8/71* (2018.01)
  *G06Q 10/06* (2012.01)

(52) U.S. Cl.
  CPC .................. *G06F 8/77* (2013.01); *G06F 8/71* (2013.01); *G06Q 10/06* (2013.01); *G06Q 10/0639* (2013.01)

(58) Field of Classification Search
  CPC .. G06F 8/77; G06F 8/71; G06Q 10/06; G06Q 10/0639
  USPC ........................................................ 717/102
  See application file for complete search history.

(56) References Cited

U.S. PATENT DOCUMENTS

| 8,413,105 | B2* | 4/2013 | Adi ...................... G06Q 10/06 |
| | | | 717/101 |
| 9,075,920 | B1* | 7/2015 | Kushnirskiy ....... G06F 11/3696 |
| 2017/0060571 | A1* | 3/2017 | Bruso ................. G06F 21/6218 |
| 2018/0173525 | A1* | 6/2018 | Suparna ..................... G06F 8/77 |
| 2018/0300221 | A1* | 10/2018 | Barbee ................ G06F 11/3688 |

FOREIGN PATENT DOCUMENTS

| JP | 5965264 B2 | 7/2016 |
| KR | 101264633 B1 | 5/2013 |

OTHER PUBLICATIONS

International Search Report and Written Opinion for PCT/US2018/062079, dated Mar. 11, 2019, 9 pages.

* cited by examiner

*Primary Examiner* — Anna C Deng
(74) *Attorney, Agent, or Firm* — Cozen O'Connor

(57) ABSTRACT

Systems and methods to autonomously generate emergent software delivery value stream graphs from work units (e.g., tasks) that are created and managed through different specialized software tools by the many teams of an entity (e.g., company, other organization) involved in large software delivery activities. The emergent software delivery value stream graphs may be produced by autonomously monitoring and integrating the activity from individual software development tools. Additionally or alternatively, emergent software delivery value stream graphs may be produced by altering a previously captured event stream based on a description of changes to a development stage stream and team information. The generated value streams may be analyzed and/or visualized to report on various aspects of the software development for an organization.

32 Claims, 12 Drawing Sheets

VALUE STREAM GRAPHS ACROSS HETEROGENEOUS SOFTWARE DEVELOPMENT PLATFORMS

BACKGROUND

Technical Field

The present disclosure generally relates to the development and delivery of software, and more particularly, to generation of software delivery value stream graphs across heterogeneous software development platforms.

Description of the Related Art

Due to recent substantial increases in the technical complexity of software, the development and delivery of software may proceed through multiple stages, often involving multiple individuals or teams of individuals and multiple specialized software tools that support the individuals and teams in their work. For example, a business analysis team may use a specialized software requirements management tool, such as Rational® DOORS® available from IBM, to record software requirements that describe the functionality that the software being developed should provide. This stage may be considered a definition stage. Software engineers, who often work on a separate team, tend to focus on an implementation stage, using specialized software tools, such as the JIRA Software® ("issue tracker") available from Atlassian, Inc., to record specific software development tasks required to implement the desired system functionality. Quality assurance teams record work about the tests needed to determine whether developed software meets the specific requirements in specialized software tools, such as HP Quality Center® available from HP®. The work done by the quality assurance teams can be considered a testing stage. There can be many different stages in development of the software with different kinds of teams and different kinds of specialized software tools involved at each stage.

The use of multiple teams to develop a software system is desirable to help manage the complexity of building software. The use of specialized software tools by teams involved in software development is desirable to make each teams work as efficiently as possible. However, the use of multiple teams and specialized tools has caused significant technical challenges that make it difficult to understand and track software delivery value streams in an organization as no one tool or no one team holds all of the information about how the software is developed and delivered.

BRIEF SUMMARY

A computer-implemented method may be summarized as including: storing, on at least one nontransitory processor-readable storage medium, work unit data for a plurality of work units, the work units created and managed via a plurality of specialized software tools through a plurality of development stages by a plurality of teams of one or more individuals associated with an entity; autonomously receiving, by at least one processor, event data indicative of an event from at least one of the plurality of specialized software tools; autonomously generating, by the at least one processor, an event stream based at least in part on the received event data, the event stream indicative of an effect, if any, that the event has on each of a plurality of value stream perspectives; and autonomously generating, by the at least one processor, a software delivery value stream graph for at least one of the plurality of value stream perspectives based at least in part on the generated event stream.

Autonomously receiving event data may include autonomously monitoring, by the at least one processor, activity of the plurality of specialized software tools via a plurality of software connectors to the specialized software tools. Autonomously monitoring activity of the specialized software tools may include autonomously monitoring activity of the specialized software tools via a plurality of software connectors to the specialized software tools, each of the software connectors may include a mapping that describes how data entered into at least one of the specialized software tools affects particular work units stored in the at least one nontransitory processor-readable storage medium.

The computer-implemented method may further include receiving, by the at least one processor, work unit data for a work unit from a user interface accessible by at least some of the individuals of the teams.

The computer-implemented method may further include autonomously receiving, by the at least one processor, work unit data for a work unit from a software connector operatively coupled to at least one of the plurality of specialized software tools.

The computer-implemented method may further include analyzing, by the at least one processor, the at least one generated software delivery value stream graph to determine at least one aspect of a software development process of the entity.

The computer-implemented method may further include causing, by the at least one processor, a graphical visualization of the at least one generated software delivery value stream graph on a display device.

Storing work unit data for a plurality of work units may include storing work unit data for a plurality of features, defects, or vulnerabilities of a software program. Autonomously generating an event stream may include autonomously generating an event stream based at least in part on the received event data, the event stream indicative of an effect, if any, that the event has on each of a development stage value stream perspective, a team value stream perspective, and a tool value stream perspective. Autonomously generating a software delivery value stream graph may include autonomously generating a development stage value stream graph, a team value stream graph, or a tool value stream graph. Autonomously generating a software delivery value stream graph may include autonomously generating a development stage value stream graph that comprises a node- and edge-weighted directed graph, each of the nodes representing a different one of the plurality of development stages. Autonomously generating a software delivery value stream graph may include autonomously generating a team value stream graph that comprises a node- and edge-weighted directed graph, each of the nodes representing a different one of the plurality of teams. Autonomously generating a software delivery value stream graph may include autonomously generating a tool value stream graph that comprises a node- and edge-weighted directed graph, each of the nodes representing a different one of the plurality of specialized software tools. Autonomously generating a software delivery value stream graph may include autonomously generating a node- and edge-weighted directed graph, and metrics for the nodes and weights of the software delivery value stream graph may be dependent at least in part on the particular value stream perspective represented by the generated software delivery value stream graph. Storing work unit data for a plurality of work units may include storing, for each of the plurality of work units, a set of development stages that a particular work unit can pass through in a development stage value stream. Autonomously generating an event stream may include autonomously generating an event stream based at least in part on the received event data, the event stream may include an identification of a work unit affected by the event, a previous and current development stage of the work unit, a previous and current team working on the work unit, and a previous and current specialized software tool being used to perform an activity associated with the work unit. Autonomously generating an event stream may include autonomously generating an event stream based at least in part on the received event data, and the event stream may include data relating to changing data in at least one of the plurality of specialized software tools.

The computer-implemented method may further include: receiving, by the at least one processor, at least a portion of a generated event stream; receiving, by the at least one processor, a list of edits to a development stage graph that corresponds to the at least a portion of the generated event stream; receiving, by the at least one processor, a list of edits to team information that corresponds to the at least a portion of the generated event stream; and generating, by the at least one processor, a new event stream based at least in part on the received at least a portion of the generated event stream, the list of edits to the development stage graph, and the list of edits to team information.

The computer-implemented method may further include autonomously generating, by the at least one processor, a new software delivery value stream graph for at least one of the plurality of value stream perspectives based at least in part on the generated new event stream.

Receiving a list of edits to a development stage graph may include receiving a list of edits that specifies at least one of: an alteration of an amount of time spent in a development stage for a type of work unit; or a removal of a node in the development stage graph, and a set of rules that describe for a given event whether a different development stage graph node should be substituted for the node specified to be removed.

A software delivery value stream graph (SDVSG) generation system may be summarized as including: at least one nontransitory processor-readable storage medium that stores at least one of processor-executable instructions or data; and at least one processor communicatively coupled to the at least one nontransitory processor-readable storage medium, in operation, the at least one processor: stores, on the at least one nontransitory processor-readable storage medium, work unit data for a plurality of work units, the work units created and managed via a plurality of specialized software tools through a plurality of development stages by a plurality of teams of one or more individuals associated with an entity; autonomously receives event data indicative of an event from at least one of the plurality of specialized software tools; autonomously generates an event stream based at least in part on the received event data, the event stream indicative of an effect, if any, that the event has on each of a plurality of value stream perspectives; and autonomously generates a software delivery value stream graph for at least one of the plurality of value stream perspectives based at least in part on the generated event stream.

The at least one processor may autonomously monitor activity of the plurality of specialized software tools via a plurality of software connectors to the specialized software tools. Each of the software connectors may include a mapping that describes how data entered into at least one of the specialized software tools affects particular work units stored in the at least one nontransitory processor-readable storage medium. The at least one processor may receive work unit data for a work unit from a user interface accessible by at least some of the individuals of the teams. The at least one processor may autonomously receive work unit data for a work unit from a software connector operatively coupled to at least one of the plurality of specialized software tools. The at least one processor may analyze the at least one generated software delivery value stream graph to determine at least one aspect of a software development process of the entity. The at least one processor may cause a graphical visualization of the at least one generated software delivery value stream graph on a display device. The plurality of work units may include a plurality of features, defects, or vulnerabilities of a software program. The event stream may be indicative of an effect, if any, that the event has on each of a development stage value stream perspective, a team value stream perspective, and a tool value stream perspective. The software delivery value stream graph may include a development stage value stream graph, a team value stream graph, or a tool value stream graph. The software delivery value stream graph may include a development stage value stream graph that comprises a node- and edge-weighted directed graph, each of the nodes representing a different one of the plurality of development stages. The software delivery value stream graph may include a team value stream graph that comprises a node- and edge-weighted directed graph, each of the nodes representing a different one of the plurality of teams. The software delivery value stream graph may include a tool value stream graph that comprises a node- and edge-weighted directed graph, each of the nodes representing a different one of the plurality of specialized software tools. The software delivery value stream graph may include a node- and edge-weighted directed graph, and metrics for the nodes and weights of the software delivery value stream graph may be dependent at least in part on the particular value stream perspective represented by the generated software delivery value stream graph. The work unit data for a plurality of work units may include, for each of the plurality of work units, a set of development stages that a particular work unit can pass through in a development stage value stream. The event stream may include an identification of a work unit affected by the event, a previous and current development stage of the work unit, a previous and current team working on the work unit, and a previous and current specialized software tool being used to perform an activity associated with the work unit. The event stream may include data relating to changing data in at least one of the plurality of specialized software tools. The at least one processor may: receive at least a portion of a generated event stream; receive a list of edits to a development stage graph that corresponds to the at least a portion of the generated event stream; receive a list of edits to team information that corresponds to the at least a portion of the generated event stream; and generate a new event stream based at least in part on the received at least a portion of the generated event stream, the list of edits to the development stage graph, and the list of edits to team information. The at least one processor may autonomously generate a new software delivery value stream graph for at least one of the plurality of value stream perspectives based at least in part on the generated new event stream. The list of edits may specify at least one of: an alteration of an amount of time spent in a development stage for a type of work unit; or a removal of a node in the development stage graph, and a set of rules that describe for a given event whether a different development stage graph node should be substituted for the node specified to be removed.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 11:
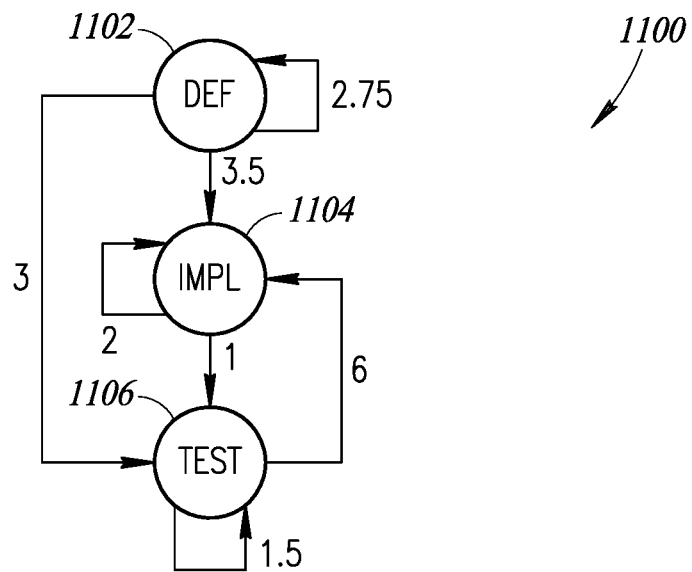
FIG. 11 is an example development stage value stream graph generated by an SDVSG generation system, according to one non-limiting illustrated implementation.
Figure 12:
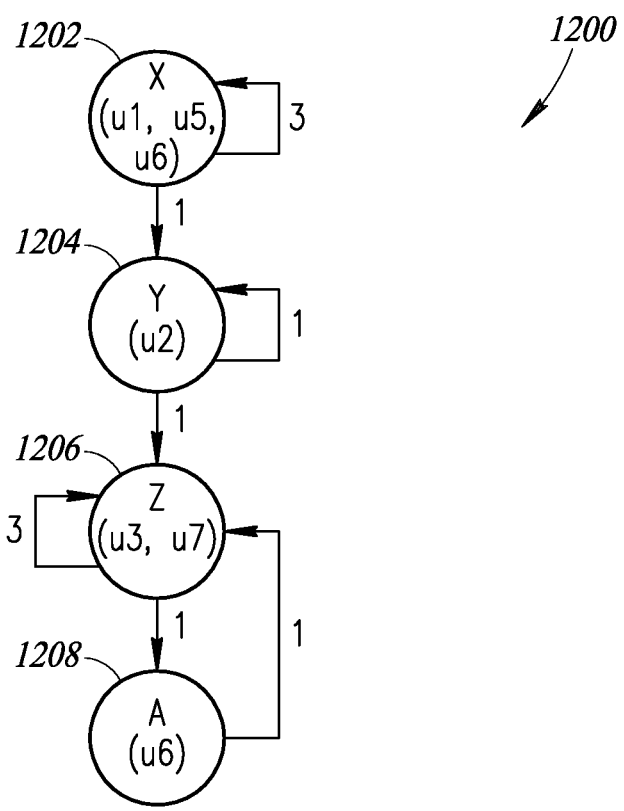
FIG. 12 is an example specialized software tool value stream graph generated by an SDVSG generation system, according to one non-limiting illustrated implementation.
Figure 13:
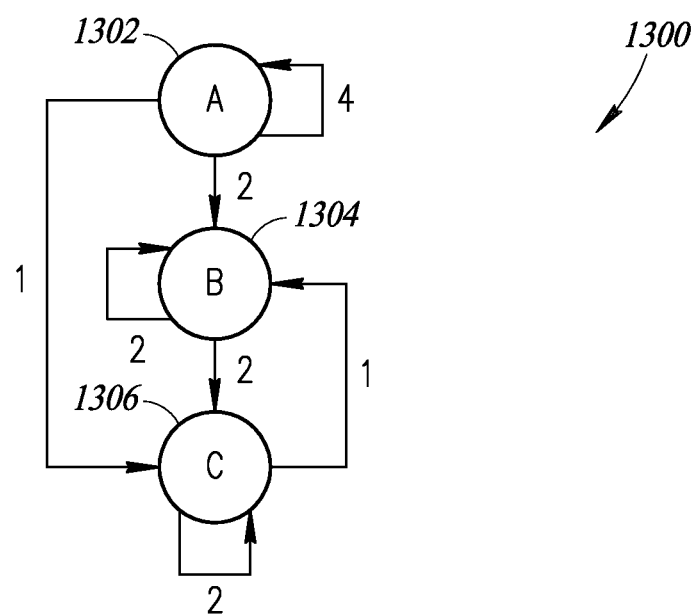
FIG. 13 is an example team value stream graph generated by an SDVSG generation system, according to one non-limiting illustrated implementation.

A software delivery value stream enables work units (e.g., tasks) across a software development organization or entity to proceed through development stages of a software development process. The work units may be features, defects, or vulnerabilities, for example. In at least some implementations of the present disclosure, the flows of these work units through development stages describe emergent software delivery value streams, which may be viewed through a plurality of perspectives. In the examples provided herein, the software delivery value streams are viewed through three perspectives, although it should be appreciated that in practice value streams may be viewed through fewer or more perspectives. A first perspective is a development stage perspective, which relates to how the work units flow through development stages of a software development process. For the development stage perspective, the systems and methods disclosed herein generate development stage software delivery value stream graphs (SDVSGs). A second perspective is a team perspective, which relates to how the work units move through various teams of one or more individuals of an entity (e.g., company, other organization) associated with a software development process. For the team perspective, the systems and methods disclosed herein generate team SDVSGs. A third perspective is a specialized software tool perspective, or "tool perspective," which relates to how the work units flow through the specialized software tools used by the various teams of an entity. For the tool perspective, the systems and methods disclosed herein generate tool SDVSGs. FIGS. 11, 12, and 13 show examples of a development stage SDVSG, a tool SDVSG, and a team SDVSG, respectively.

In at least some implementations, an emergent value stream may be represented as a node- and edge-weighted directed graph where the nodes of the graph represent a particular perspective (e.g., a particular development stage, a particular team, or a particular tool), and edges represent flows of work units between the nodes (e.g., between development stages, between teams, or between tools). In at least some implementations, node weights may represent such information as the number of users of a tool, for example. In at least some implementations, edge weights may represent such information as the counts of the units of work flowing along an edge between nodes.

Generally, the implementations of the present disclosure provide systems and methods to autonomously create emergent SDVSGs from work units that are created and managed through different specialized software tools by the many teams involved in large software delivery activities. As an example, the emergent SDVSGs may be produced by autonomously monitoring and integrating the activity from individual software development tools. Additionally or alternatively, emergent SDVSGs may be produced by altering a previously captured event stream based on a description of changes to a development stage stream and changes to team information, for example. As discussed further below, these value streams may be analyzed and/or visualized to report on various aspects of the software development process for an organization.

Figure 1:
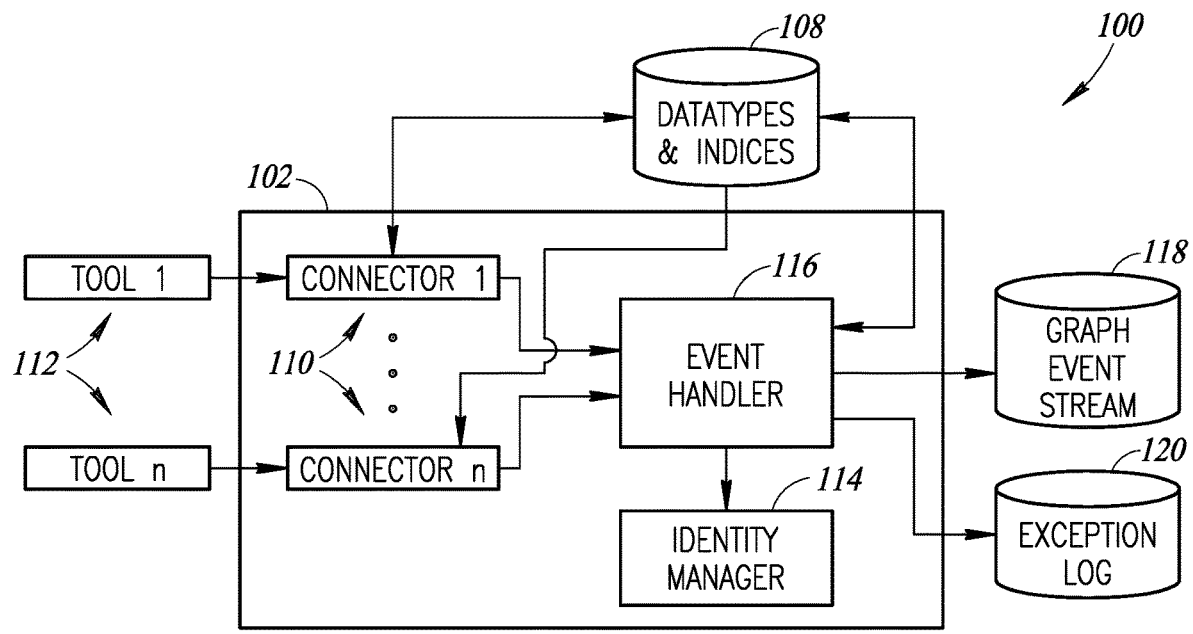
FIG. 1 is a schematic block diagram of an event stream generation subsystem of a software delivery value stream graph (SDVSG) generation system, according to one non-limiting illustrated implementation.
Figure 2:
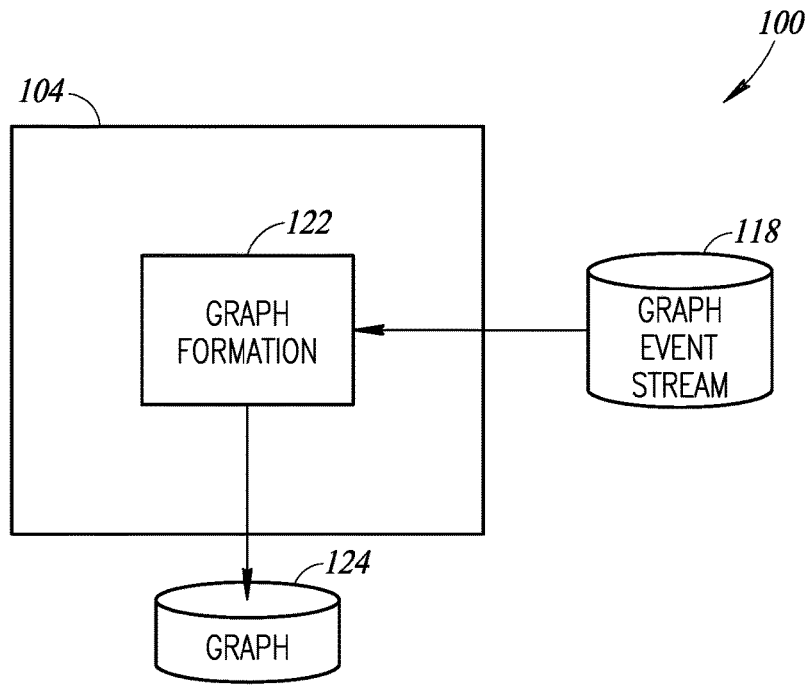
FIG. 2 is a schematic block diagram of a graph generation subsystem of an SDVSG generation system, according to one non-limiting illustrated implementation.
Figure 3:
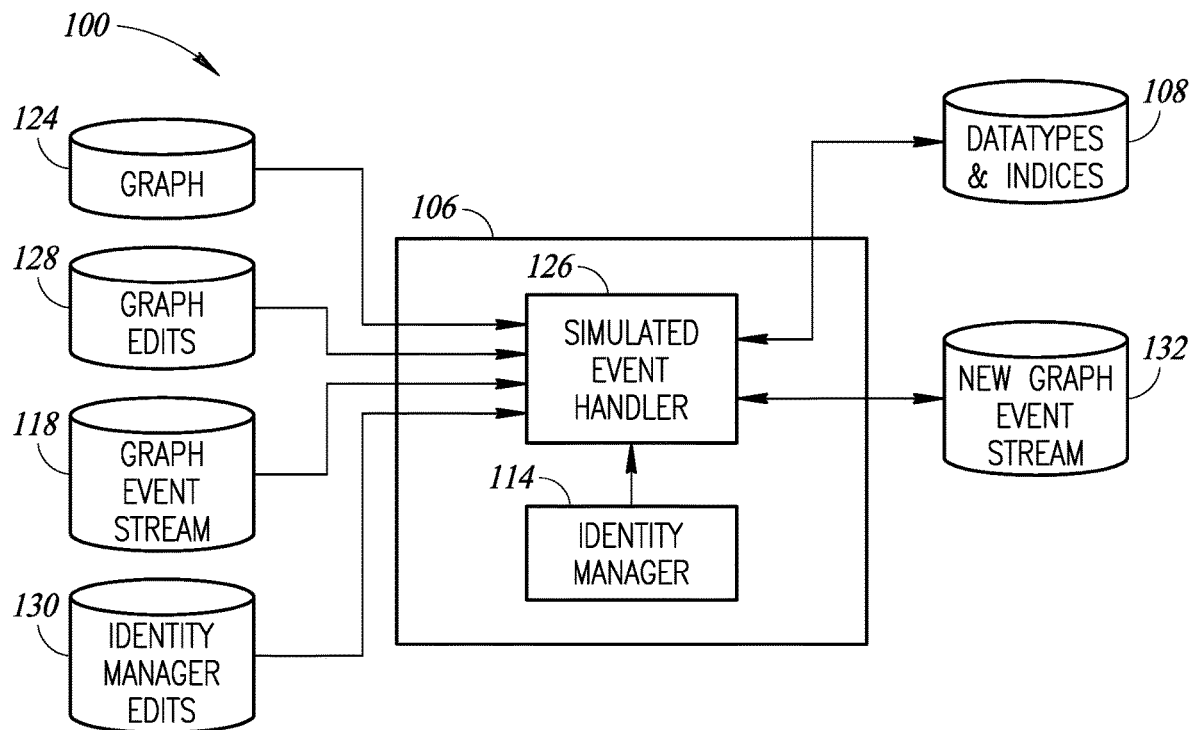
FIG. 3 is a schematic block diagram of an event stream alteration subsystem of an SDVSG generation system, according to one non-limiting illustrated implementation.
Figure 14:
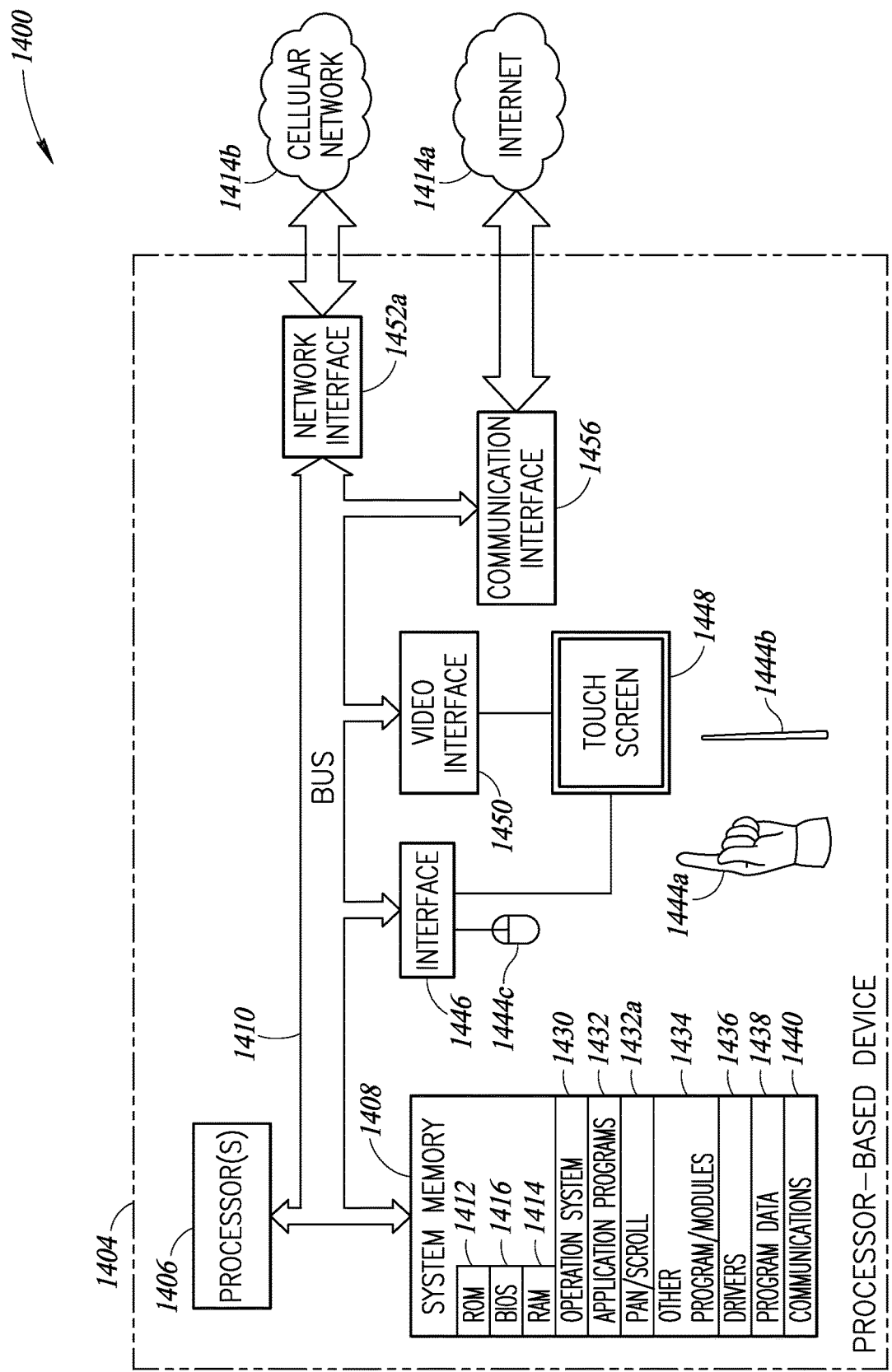
FIG. 14 is a block diagram of an example processor-based device that may be used to implement one or more of the systems or subsystems described herein, according to one non-limiting illustrated implementation.

FIGS. 1-3 show schematic block diagrams of various subsystems of a SDVSG generation system 100. In particular, FIG. 1 shows a schematic block diagram of an event stream generation subsystem 102 of the SDVSG generation system 100, FIG. 2 shows a schematic block diagram of a graph generation subsystem 104 of the SDVSG generation system, and FIG. 3 shows a schematic block diagram of an event stream alteration subsystem 106 of the SDVSG generation system. Although the subsystems 102, 104 and 106 are shown as separate components of the SDVSG generation system 100 for explanatory purposes, it should be appreciated that the various functionality of one or more (e.g., all) of the subsystems may be implemented on one or more physical processor-based devices, such as one or more handheld devices (e.g., smartphones and tablet computers), wearable devices, multiprocessor systems, microprocessor-based or programmable consumer electronics, personal computers ("PCs"), network PCs, minicomputers, mainframe computers, cloud computing systems, etc. FIG. 14, discussed below, provides an example processor-based device that may be used to implement the functionality of one or more of the subsystems 102, 104 and 106 of the SDVSG system 100.

Referring to FIG. 1, the event stream generation subsystem 102 includes or is operatively coupled to a datatypes and indices storage 108, which may be any suitable nontransitory processor-readable storage medium. The storage 108 stores data types (e.g., definitions) for work units, such as feature data type, defect data type, and vulnerability data type. An operator of the event stream generation subsystem 102 may define these work units.

As an example, each of the types may define a field to hold a unique identifier (e.g., unique value) to identify the work unit, and a field to hold a name to refer to the work unit. Each of the types may also define a set of development stages that an instance of the type may pass through in a value stream defined as a set of enumerated examples (e.g., definition stage, implementation stage, testing stage). In at least some implementations, each of the types may include an optional set of fields wherein each field has a name and a data type.

The event stream generation subsystem 102 also includes a plurality of software connectors 110, designated connectors 1 to n, that connect to a plurality of specialized software tools 112, designated tools 1 to n, used by the various teams of one or more individuals involved in software development. The connectors 110 include mappings (e.g., configuration) to describe how data entered into the specialized software tools 112 by teams creates, maps to, and affects instances of the data types maintained by the event stream generation subsystem 102.

The event stream generation subsystem 102 also includes an identity manager 114 that may provide team information, including the geographic location of the team, for each of the users of the software tools 112.

The event stream generation subsystem 102 also includes an event handler 116 that, in operation, processes events to work units (e.g., features, vulnerabilities, defects) provided autonomously by the connectors 110. The event handler 116 produces a graph event stream 118 that specifies the effect, if any, of the event on three value stream perspectives, the development stage perspective, the team perspective, and the tool perspective. In at least some implementations, the event handler 116 may produce an event stream 118 that specifies the effect of the event on other value stream perspectives, dependent on the particular needs and structure of a software development entity.

The event handler 116 processes the events to generate (e.g., output) the graph event stream 118. Each of the graph event streams 118 may include an identification (e.g., unique identifier, name) of the work unit affected, as well as the date and time that the event occurred. Each of the graph event streams 118 may also include the previous and current development stages (e.g., definition, implementation, testing) of the work unit, along with the elapsed time spent in the previous development stage. Each of the graph event streams 118 may also include the previous and current team working on the work unit. Each of the graph event streams 118 may also include the previous and current specialized software tool 112 used to perform activity on the work unit. Each of the graph event streams 118 may also include data about the changing data in the specialized software tools 112 as determined by the configuration of one or more of the connectors 110. Information about the value of the data in the specialized software tools 112, such as the status field of data in a tool, may also be recorded.

The event handler 116 may also write an exception log 120 when errors occur. As an example, each record of the exception log 120 may include an identification (e.g., unique identifier, name) of the work unit affected, as well as the date and time that the event occurred. Each record of the exception log 120 may also include an indication of the error (e.g., inability to identify the team associated with the event). Each record of the exception log 120 may also include a message associated with the error, if available. Each record of the exception log 120 may also include details of the original change being processed.

An instance of a work unit data type (e.g., feature, defect, vulnerability) stored in the datatypes and indices storage 108 may be entered manually by an operator, or may be created autonomously by one or more of the connectors 110 to one or more of the software tools 112.

As noted above, each of the connectors 110 contains a mapping that describes how data from a software tool 112 relates to instances of data types (e.g., feature, defect, vulnerability) stored in the event stream generation subsystem 102. Creation of data in a software tool 112, such as creation of a new requirement in a business analyst's software tool, may cause the creation of a new instance of a data type (e.g., new instance of a feature) in the event stream generation subsystem 102, may cause the update of data on an instance of a data type in the event stream generation subsystem, or may have no effect on an instance of a data type in the event stream generation subsystem, depending on the configuration of the particular connector 110. This processing is discussed further below.

Referring now to FIG. 2, the graph generation subsystem includes a graph formation component 122 that processes the input graph event stream 118 generated by the event stream generation subsystem 102 and produces one of a plurality (e.g., three) emergent software delivery value stream graphs (SDVSGs) 124. The particular graphs 124 generated by the graph generation subsystem 104 may be indicated by an operator via a suitable user interface, for example.

In at least some implementations, the graph generation subsystem 104 may be operative to generate one or more of three SDVSGs, namely, a development stage SDVSG, a team SDVSG, and a tool SDVSG. As an example, the development stage SDVSG may be a graph that has nodes that are each a development stage (e.g., definition stage, implementation stage, testing stage) of a software development process, the number of work units in each development stage, and the transitions between development stages that have occurred may be represented as edges of the graph. In at least some implementations, the number of such transitions may be represented as weights on the edges of the graph.

The team SDVSG may be a graph that has nodes that are each one of the teams of one or more individuals of a software development organization, indicating the number of work units worked on by each team. The edges of the graph may represent the transitions of the work units between the teams. In at least some implementations, the number of such transitions may be represented as weights on the edges of the graph.

The tool SDVSG may be a graph that has nodes that are each one of the specialized software tools used by the teams, indicating the number of work units worked on in each tool. The edges of the graph may represent the transitions of the work units between the tools. In at least some implementations, the number of such transitions may be represented as weights on the edges of the graph.

The graph generation subsystem 104 may report at least a portion of any or all of the value stream for a selected work unit or for a selected type of work unit (e.g., all features, all vulnerabilities) for selected portions of the SDVSGs generated by the graph generation subsystem.

Referring now to FIG. 3, the event stream alteration subsystem 106 includes a simulated event handler component 126. The simulated event handler component 126 takes as input a graph event stream 118 (or portion thereof) generated by the event stream generation subsystem 102, as discussed above. The simulated event handler component 126 also takes as input a list of development stage graph edits 128, which are edits to the development stage graph representation that correspond to the input graph event stream. As an example, an edit may be an alteration (e.g., increase, decrease) to the amount of time spent in a development stage node defined in the development stage graph for a give work unit data type (e.g., feature, defect, vulnerability). An edit may also be the removal of a node in the development stage graph, along with an ordered list of rules that describe, for a given event, whether a different development stage graph node should be substituted. If no edit rule applies, the event may be discarded. The simulated event handler component 126 may also take as input a list of edits 130 to the identity manager that includes a change in the geographical location of a team (or a member thereof) with an associated alteration (e.g., increase or decrease, stated as a factor) to the latency of response by the team.

The simulated event handler 126 of the event stream alteration subsystem 106 may then autonomously process the input event stream 118 by applying the received edits to the development stage graph 124 and the teams, and producing a new graph event stream 132 that can be fed to and processed by the graph generation subsystem 104 (FIG. 2).

Figure 4:
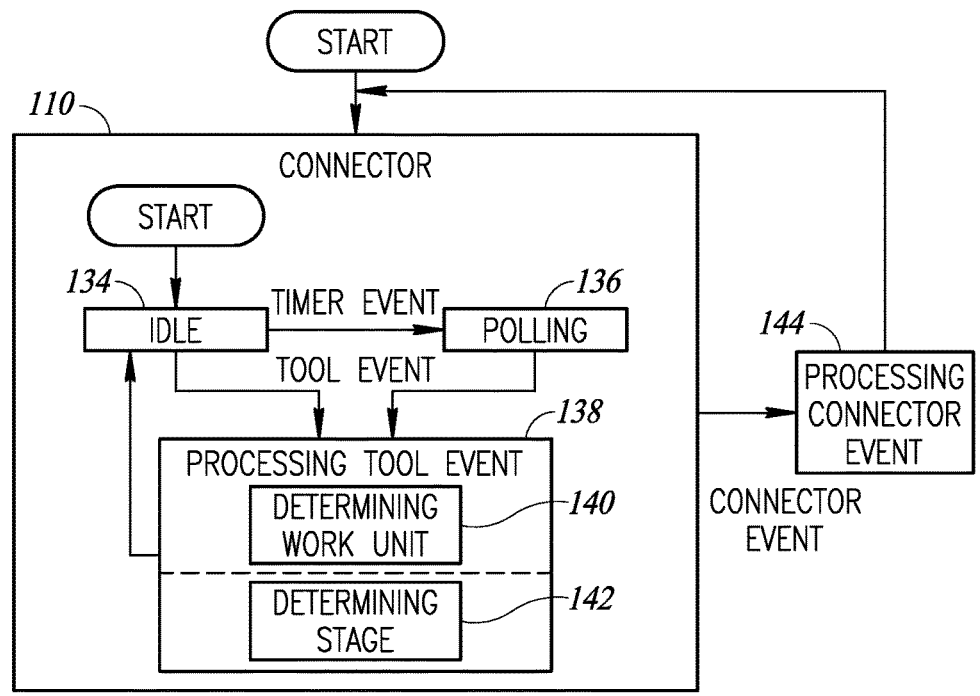
FIG. 4 is a state chart for a connector of the event stream generation subsystem of FIG. 1, according to one non-limiting illustrated implementation.

FIG. 4 is a state chart for a connector 110 (e.g., one of the connectors 110 of FIG. 1) of the event stream generation subsystem 102 that shows the main states that occur for the processing of tool events received or detected by the connector 110 from a software tool 112, for example. Initially, the connector 110 is in an idle state 134. Responsive to a timer event, the connector 110 may enter into a polling state 136. From either the idle state 134 or the polling state 136, the connector 110 may receive or otherwise detect a tool event from a specialized software tool 112 to which the connector is connected. The connector 110 may then process the tool event 138, which may include determining the work unit(s) 140 affected by the event and determining the development stage(s) 142 affected by the event. The connector 110 may then output a connector event for processing 144 by the event handler 116 of the event stream generation subsystem 102 (FIG. 1).

Figure 5:
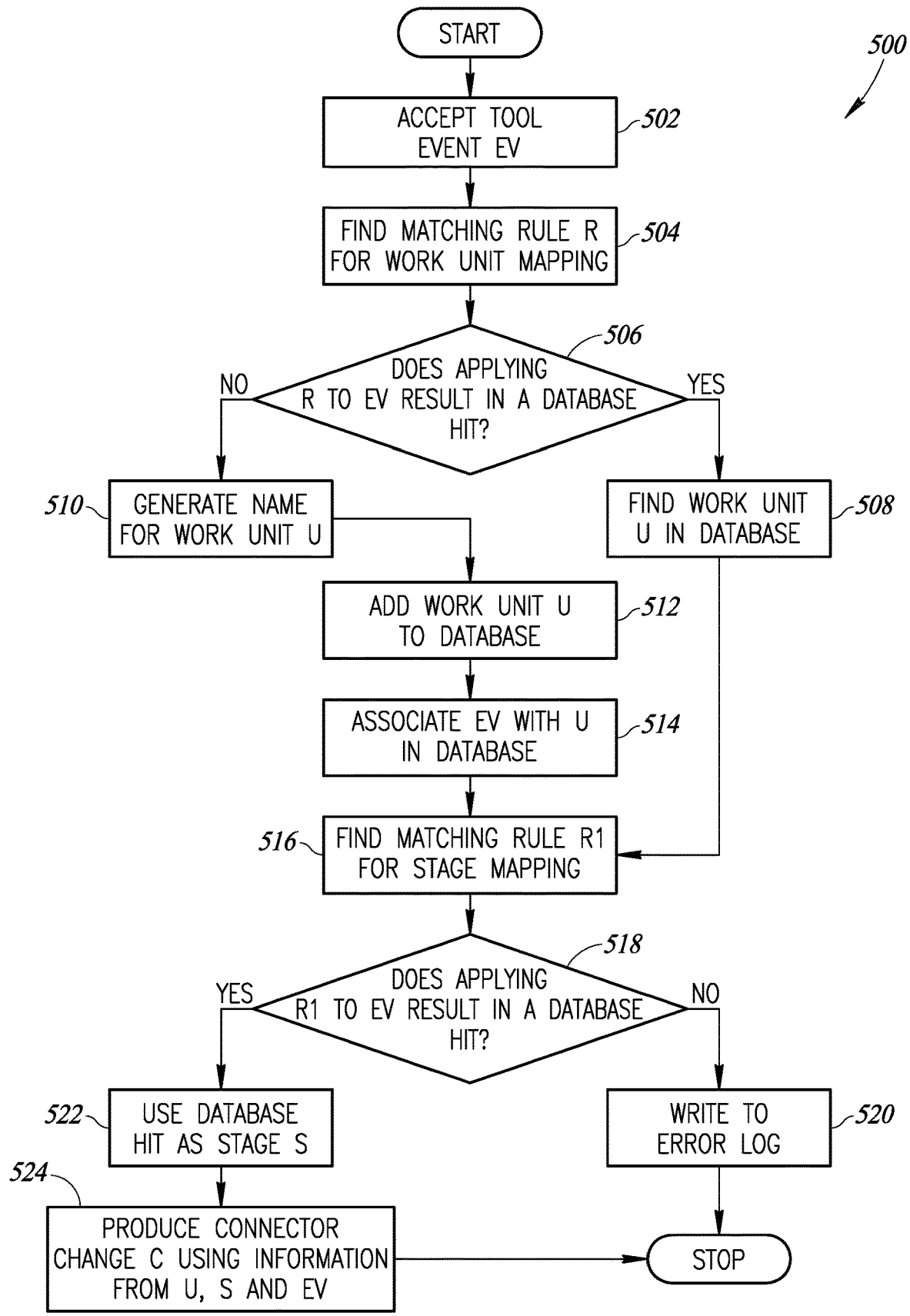
FIG. 5 is a flow diagram for a method of operating a connector of an event stream generation subsystem to process a tool event of a specialized software tool, according to one non-limiting illustrated implementation.

FIG. 5 is a flow diagram that illustrates an example method 500 of operating a connector (e.g., one of the connectors 110 of FIG. 1) to process a tool event received from a specialized software tool, such as one of the software tools 112 of FIG. 1. The method 500 begins at 502, wherein the connector accepts a tool event EV (e.g., from a software tool). At 504, the connector finds matching rules R to map the event EV to a work unit. Below are two non-limiting examples of how rules may work, wherein regular expressions for field values may indicate how to form a work unit:

(1) JIRA connector: type=task sub-task creates a work unit of type task where the name of the task comes from the title of the JIRA task; or (2) Service Now connector: type=incident creates a work unit of type defect and the name of defect comes from the name of the caller appended with the time of the call.

At 506, the connector determines whether applying the rules R to the event EV results in a database hit for an existing work unit. If applying the rules R to the event EV results in a database hit (i.e., act 506=yes), then the connector finds the work unit U in a database at 508.

If applying the rules R to the event EV does not result in a database hit (i.e., act 506=no), then the connector generates a name for a work unit U (act 510) and adds the work unit U to the database (act 512). At 514, the connector logically associates the event EV with the work unit U in the database.

After the connector has determined the work unit, at 516 the connector may find matching rules R1 for development stage mapping. At 518, the connector determines whether applying the rules R1 to the event EV results in a database hit. At 520, if applying the rules R1 to the event EV does not result in a database hit (i.e., act 518=no), the connector may write to an error log indicating that no development stage was identified. At 522, if applying the rules R1 to the event EV does result in a database hit (i.e., act 518=yes), the connector may use the database hit as the development stage S. At 524, the connector produces a connector change C using the information from the work unit U, the development stage S, and the event EV.

Figure 6:
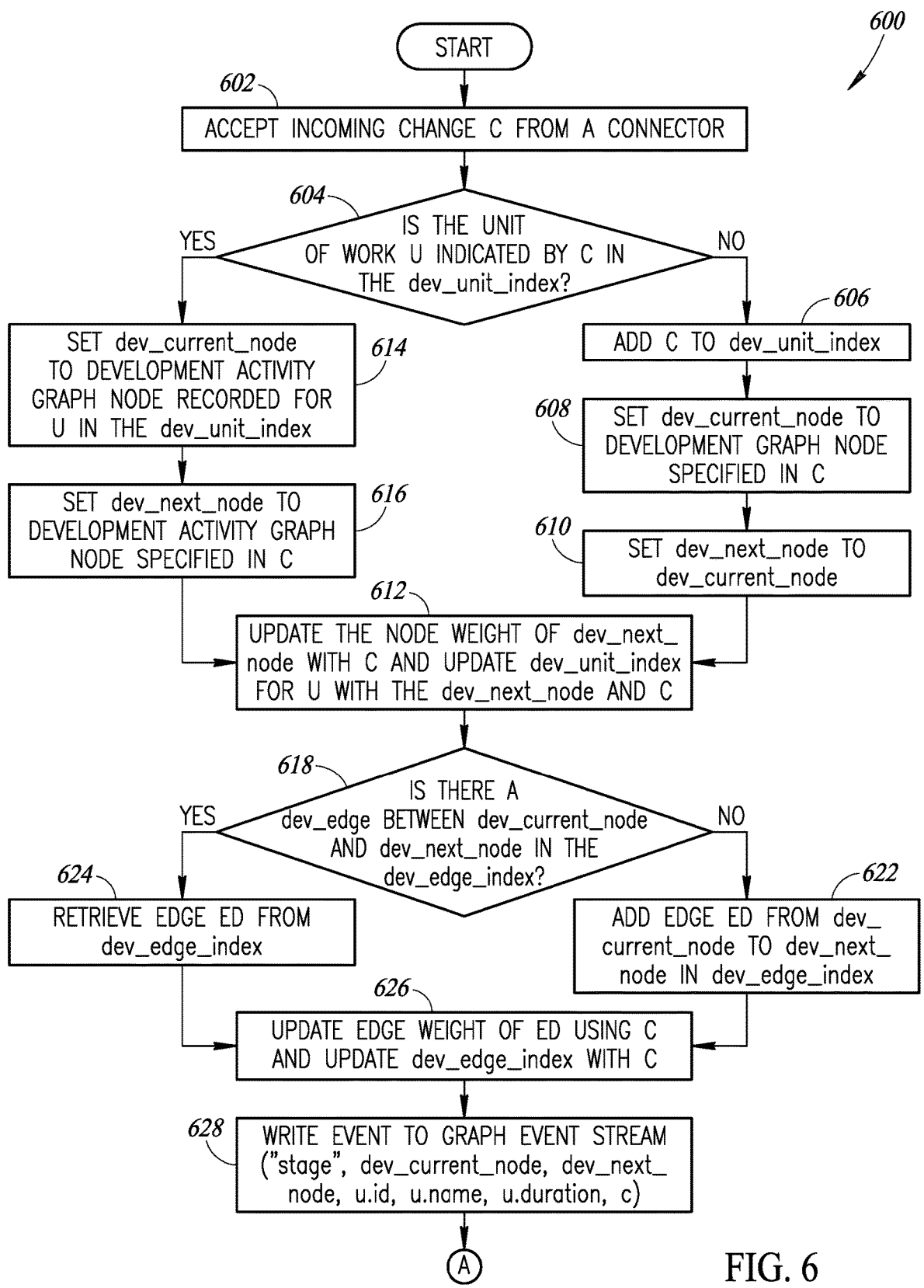
FIG. 6 is a flow diagram for a method of operating an event stream generation subsystem to generate an event stream, in particular, to process an event for a development stage perspective, according to one non-limiting illustrated implementation.
Figure 7:
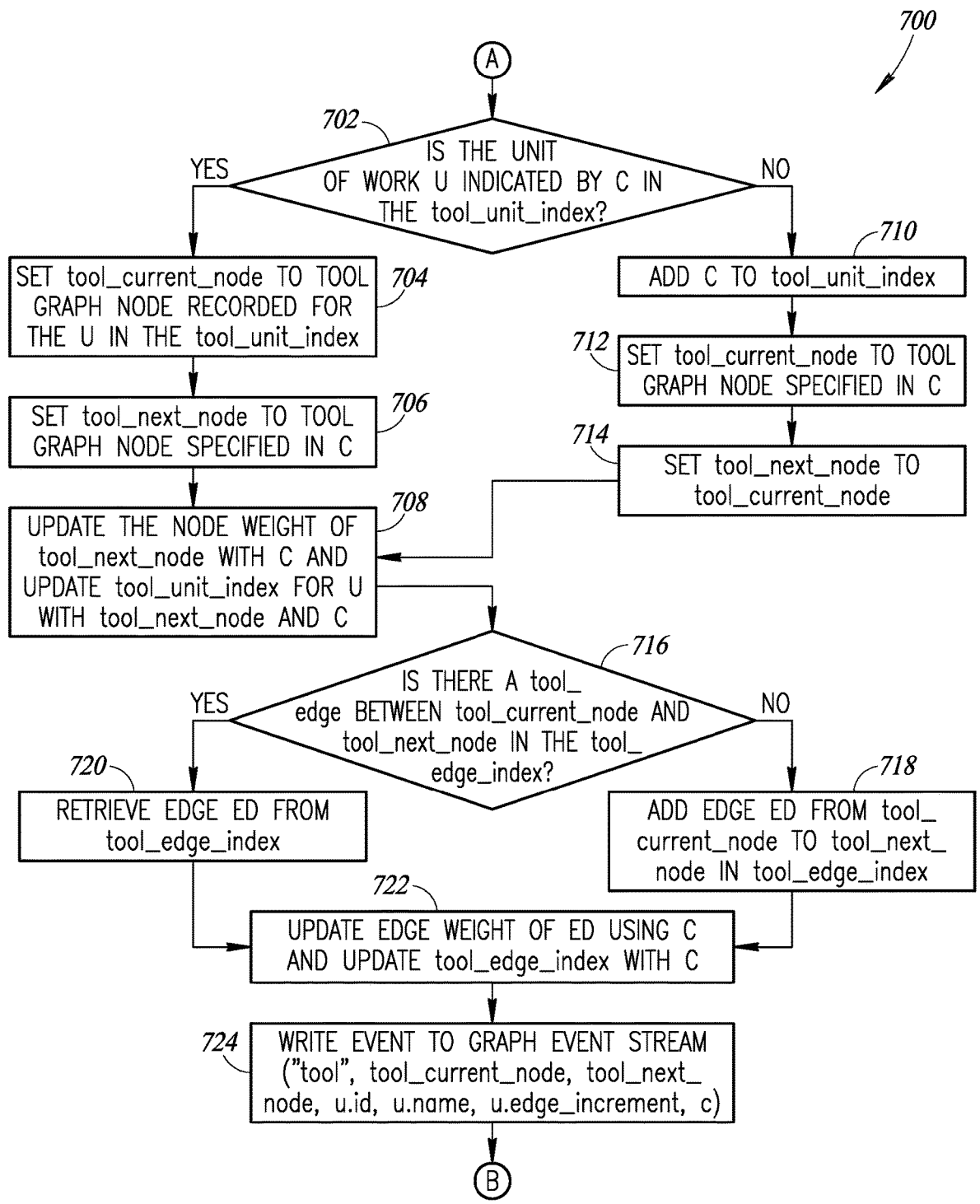
FIG. 7 is a flow diagram for a method of operating an event stream generation subsystem to generate an event stream, in particular, to process an event for a specialized software tool perspective, according to one non-limiting illustrated implementation.
Figure 8:
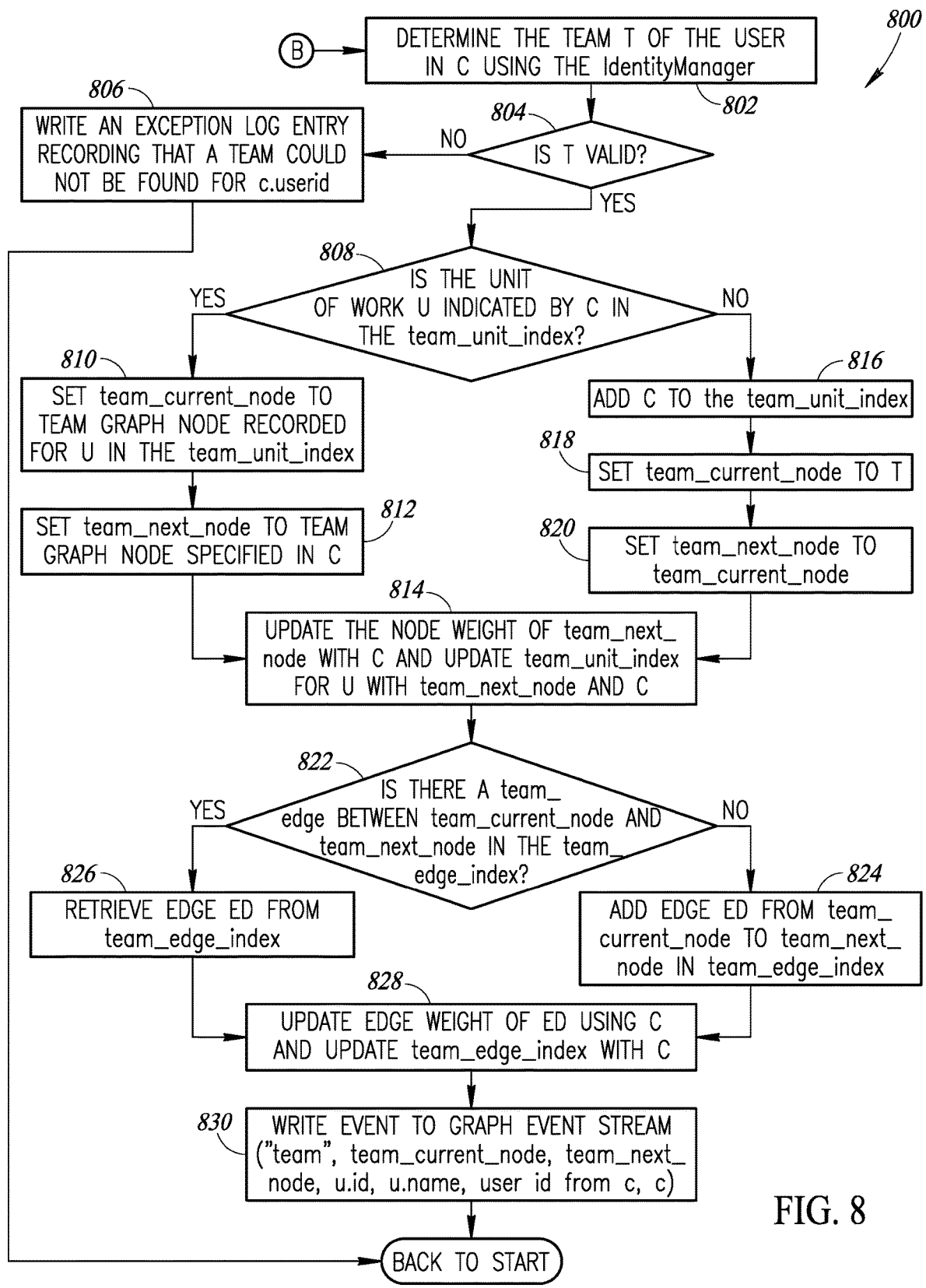
FIG. 8 is a flow diagram for a method of operating an event stream generation subsystem to generate an event stream, in particular, to process an event for a team perspective, according to one non-limiting illustrated implementation.

FIGS. 6-8 are flow diagrams for a method of operating an event stream generation subsystem, such as the event stream generation subsystem 102 of FIG. 1, to generate an event stream. In particular, FIG. 6 depicts a method 600 to process an event for a development stage perspective, FIG. 7 depicts a method 700 to process an event for a specialized software tool perspective, and FIG. 8 depicts a method 800 to process an event for a team perspective. The methods 600, 700 and 800 may be implemented in the sequential order discussed below, in a different sequential order, or and/or in parallel with each other.

Referring first to the method 600 of FIG. 6, at 602 the event stream generation subsystem may accept an incoming change C from a connector (e.g., one of the connectors 110 of FIG. 1). The change C may describe which type of work unit U is described by the change C. At 604, the event stream generation subsystem may determine whether the work unit U indicated by the change C is in a dev_unit_index, which is an index of work units (e.g., feature) {type, id} to development stages with a list of changes C. The event stream generation subsystem may also include a dev_edge_index, which is an index of development stage current node (dev_current_node) and development stage next node (dev_next_node) to edge details provided in the change C.

If the work unit U is not in the dev_unit_index, at 606 the event stream generation subsystem may add the change C to the dev_unit_index. At 608, the event stream generation subsystem may set the dev_current_node to the development graph node specified in the change C. At 610, the event stream generation subsystem may set the dev_next_node to the dev_current_node. At 612, the event stream generation subsystem may update the node weight of dev_next_node with the change C and update dev_unit_index for the work unit U with the dev_next_node and the change C.

If the work unit U is in the dev_unit_index (i.e., act 604=yes), at 614 the event stream generation subsystem may set the dev_current_node to the development activity graph node recorded for the work unit U in the dev_unit_index. At 616, the event stream generation subsystem may set the dev_next_node to the development activity graph node specified in the change C. Then, as noted above, at 612 the event stream generation subsystem may update the node weight of the dev_next_node with the change C and update the dev_unit_index for the work unit U with the dev_next_node and the change C.

At 618, the event stream generation subsystem may determine whether there is a dev_edge between the dev_current_node and the dev_next_node in the dev_edge_index. At 620, if there is not a dev_edge between the dev_current_node and the dev_next_node in the dev_edge_index, the event stream generation subsystem may add an edge ED from the dev_current_node to the dev_next_node in the dev_edge_index. At 622, if there is a dev_edge between the dev_current_node and the dev_next_node in the dev_edge_index, the event stream generation subsystem may retrieve the edge ED from the dev_edge_index.

At 626, the event stream generation subsystem may update the edge weight of the edge ED using the change C and may update the dev_edge_index with the change C. At 628, the event stream generation subsystem may write the event to the graph event stream, which includes parameters "stage," dev_current_node, dev_next_node, u.id, u.name, u.duration, and the change C.

The process may proceed to the method 700 of FIG. 7. At 702, the event stream generation subsystem determines whether the work unit U indicated by the change C is in a tool_unit_index, which is an index of work units to a list of changes C. The event stream generation subsystem may also include a tool_edge_index, which is an index of tool_current_node and tool_next_node to the edge details specified in the change C.

At 704, if the work unit U indicated by the change C is in the tool_unit_index, the event stream generation subsystem may set the tool_current_node to the tool graph node recorded for the work unit U in the tool_unit_index. At 706, the event stream generation subsystem may set the tool_next_node to the tool graph node specified in the change C. At 708, the event stream generation subsystem may update the node weight of the tool_next_node with the change C and update the tool_unit_index for the work unit U with the tool_next_node and the change C.

At 710, if the work unit U indicated by the change C is not in the tool_unit_index, the event stream generation subsystem may add the change C to the tool_unit_index. At 712, the event stream generation subsystem may set the tool_current_node to the tool graph node specified in the change C. At 714, the event stream generation subsystem may set the tool_next_node to the tool_current_node. Then, as noted above, at 708 the event stream generation subsystem may update the node weight of the tool_next_node with the change C and update the tool_unit_index for the work unit U with the tool_next_node and the change C.

At 716, the event stream generation subsystem may determine whether there is a tool_edge between the tool_current_node and the tool_next_node in the tool_edge_index. At 718, if there is not a tool_edge between the tool_current_node and the tool_next_node in the tool_edge_index, the event stream generation subsystem may add an edge ED from the tool_current_node to the tool_next_node in the tool_edge_index. At 720, if there is a tool_edge between the tool_current_node and the tool_next_node in the tool_edge_index, the event stream generation subsystem may retrieve the edge ED from the tool_edge_index.

At 722, the event stream generation subsystem may update the edge weight of the edge ED using the change C and may update the tool_edge_index with the change C. At 724, the event stream generation subsystem may write the event to the graph event stream, which may include parameters "tool," tool_current_node, tool_next_node, u.id, u.name, u.edge_increment, and the change C.

The process may proceed to the method 800 of FIG. 8. At 802, the event stream generation subsystem determines the team T of the user specified in the change C using the identity manager (e.g., identity manager 114 of FIG. 1). At 804, the event stream generation subsystem determines whether the team T is valid. At 806, if the team T is not valid, the event stream generation subsystem may write an exception log entry recording that a team could not be found for the user specified in the change C (c.userid).

If the team T is valid, at 808 the event stream generation subsystem determines whether the work unit U indicated by the change C is in a team_unit_index, which is an index of work units to a list of changes C. The event stream generation subsystem may also include a team_edge_index, which is an index of team_current_node and team_next_node to edge details specified in the change C.

At 810, if the work unit U indicated by the change C is in the team_unit_index, the event stream generation subsystem may set the team_current_node to the team graph node recorded for the work unit U in the team_unit_index. At 812, the event stream generation subsystem may set the team_next_node to the team graph node specified in the change C. At 814, the event stream generation subsystem may update the node weight of the team_next_node with the change C and update the team_unit_index for the work unit U with the team_next_node and the change C.

At 816, if the work unit U indicated by the change C is not in the team_unit_index, the event stream generation subsystem may add the change C to the team_unit_index. At 818, the event stream generation subsystem may set the team_current_node to the team T specified in the change C. At 820, the event stream generation subsystem may set the team_next_node to the team_current_node. Then, as noted above, at 814 the event stream generation subsystem may update the node weight of the team_next_node with the change C and update the team_unit_index for the work unit U with the team_next_node and the change C.

At 822, the event stream generation subsystem may determine whether there is a team_edge between the team_current_node and the team_next_node in the team_edge_index. At 824, if there is not a team_edge between the team_current_node and the team_next_node in the team_edge_index, the event stream generation subsystem may add an edge ED from the team_current_node to the team_next_node in the team_edge_index. At 826, if there is a team_edge between the team_current_node and the team_next_node in the team_edge_index, the event stream generation subsystem may retrieve the edge ED from the team_edge_index.

At 828, the event stream generation subsystem may update the edge weight of the edge ED using the change C and may update the team_edge_index with the change C. At 830, the event stream generation subsystem may write the event to the graph event stream, which includes parameters "team," team_current_node, team_next_node, u.id, u.name, user id from the change C, and the change C.

The process may then return to act 602 of the method 600 to process additional changes.

Figure 9:
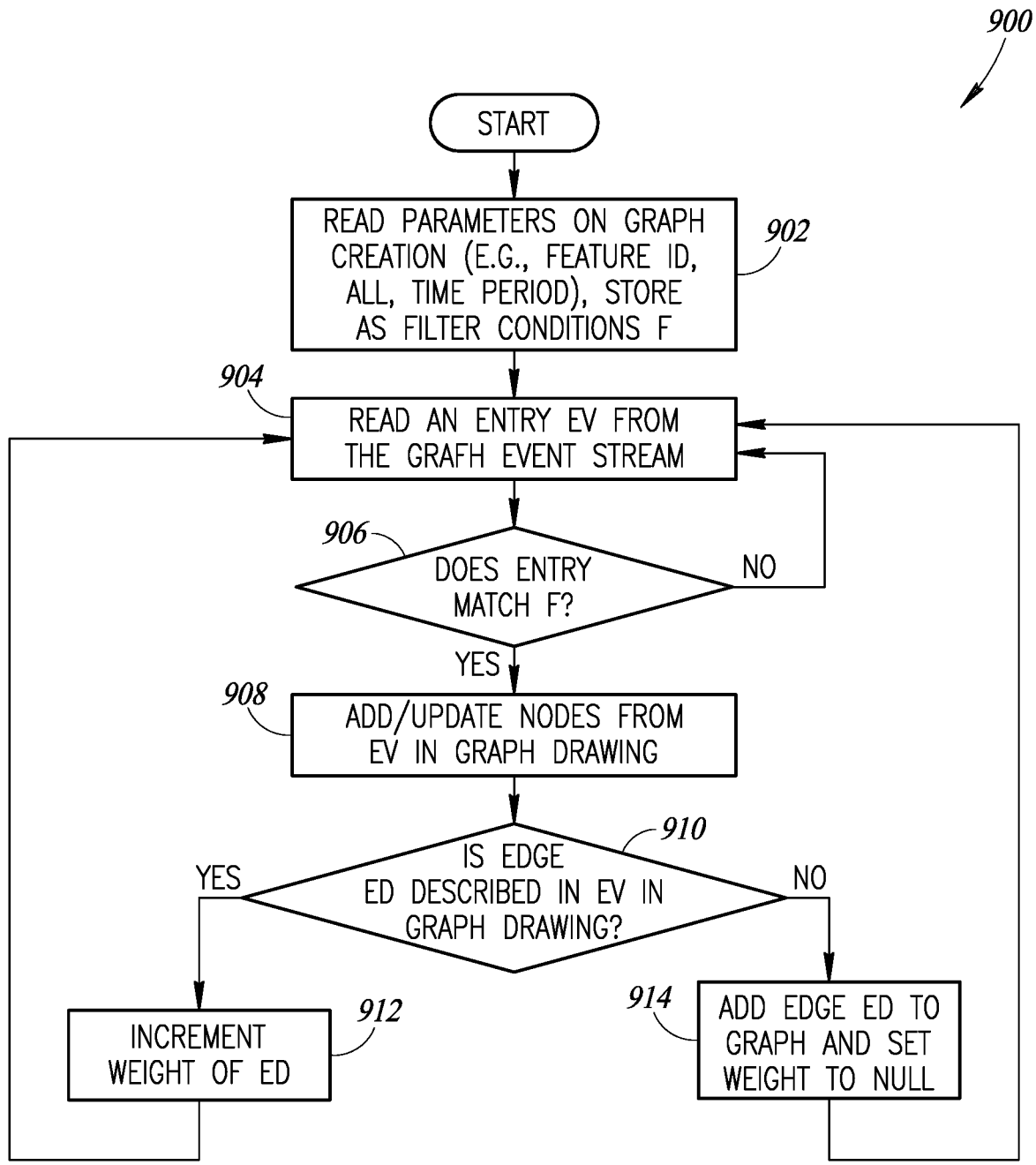
FIG. 9 is a flow diagram for a method of operating a graph generation subsystem of an SDVSG generation system, according to one non-limiting illustrated implementation.

FIG. 9 is a flow diagram for a method 900 of operating a graph generation subsystem of an SDVSG generation system, such as the graph generation subsystem 104 of the SDVSG generation system 100 shown in FIG. 2. At 902, the graph generation subsystem may read parameters on graph creation (e.g., feature ID, all, time period), and may store such as filter conditions F. At 904, the graph generation subsystem may read an event entry EV from the event stream generated by the event stream generation subsystem. At 906, the graph generation subsystem may determine whether the event entry EV matches the stored filter conditions F.

If the event entry EV does not match the stored filter conditions F, the process may return to act 904 to read another event entry EV from the event stream. At 908, if the event entry EV matches the stored filter conditions F, the graph generation subsystem may add or update nodes from the event in one or more graph drawings.

At 910, the graph generation subsystem may determine whether an edge ED described in the event entry is already in the graph drawing. If the edge is already in the graph drawing, at 912 the graph generation subsystem may increment the weight of the edge. If the edge is not already in the graph drawing, at 914 the graph generation subsystem may add the edge to the graph and set the weight to NULL. Control may then return to act 904 to read another event entry EV from the event stream.

It should be appreciated that each kind of value stream graph (e.g., development stage value stream graph, tool value stream graph, team value stream graph) may have different metrics that are used for node and edge weights. In at least some implementations, the metrics may be user selectable, or may be preselected for each of the various types of value stream graphs generated by the graph generation subsystem.

Figure 10A:
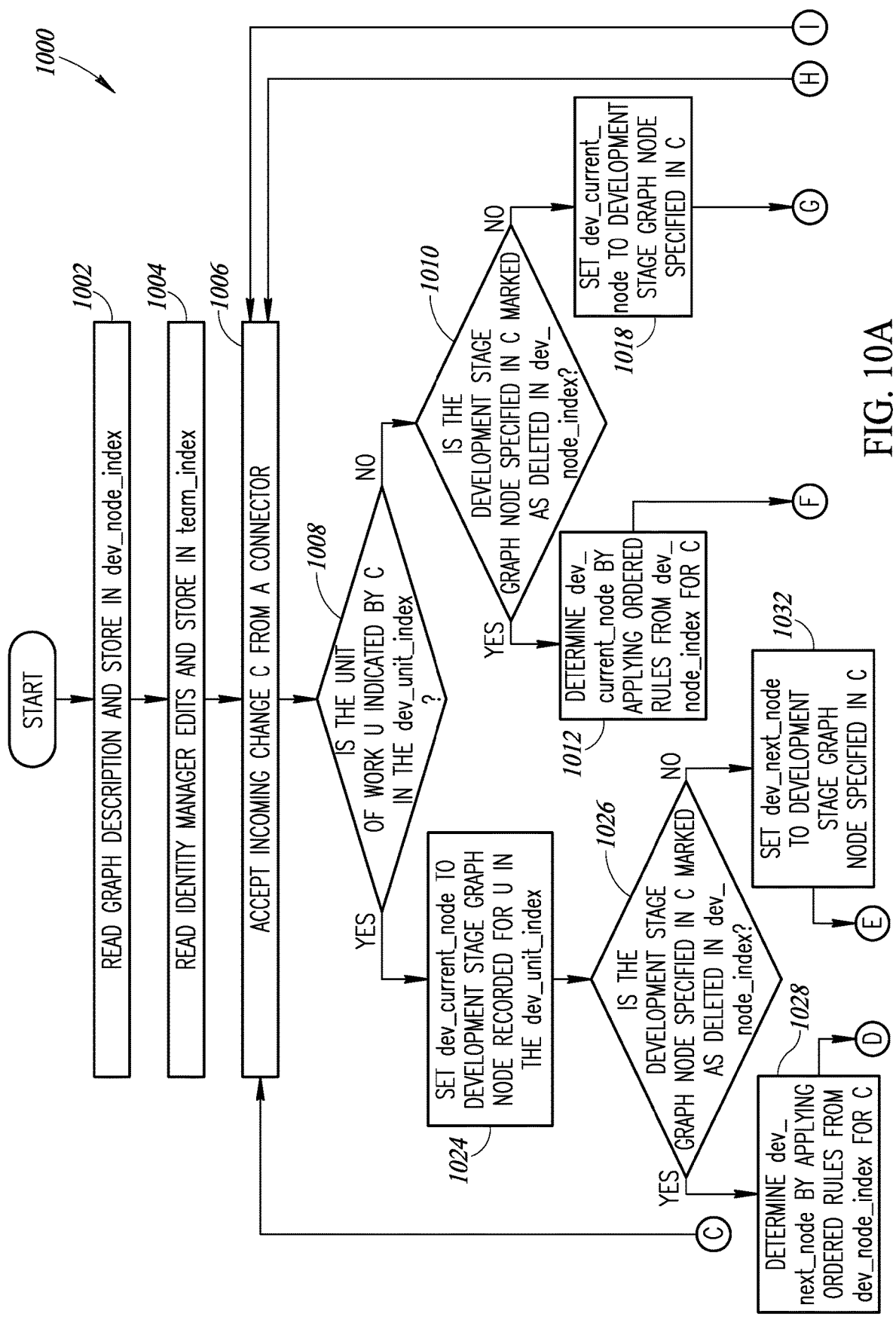
FIGS. 10A-10B are a flow diagram for a method of operating an event stream alteration subsystem of an SDVSG generation system, according to one non-limiting illustrated implementation.
Figure 10B:
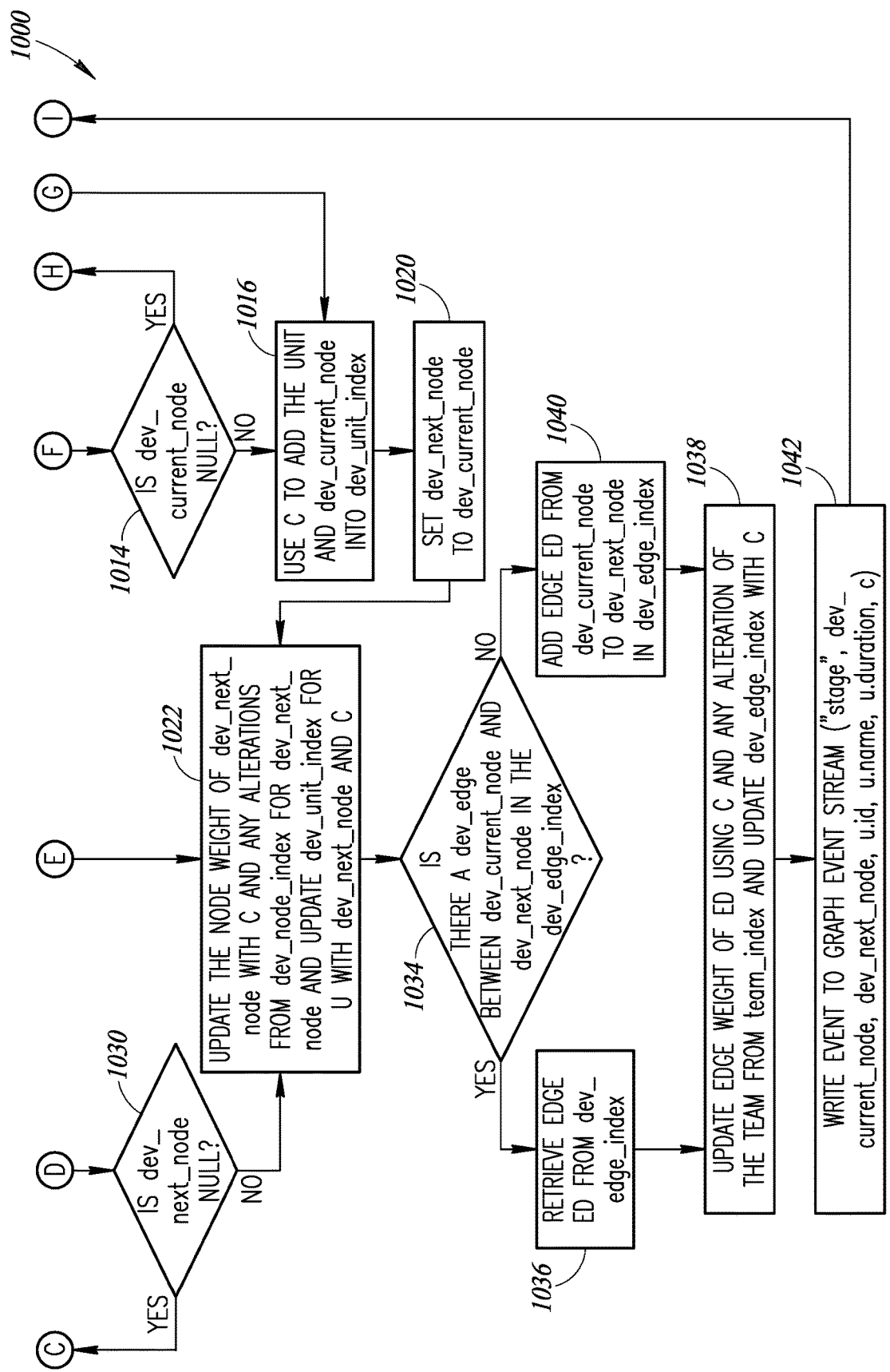

FIGS. 10A-10B are a flow diagram for a method 1000 of operating an event stream alteration subsystem of an SDVSG generation system, such as the event stream alteration subsystem 106 of the SDVSG generation system 100 shown in FIG. 1. The event stream alteration subsystem may store a dev_node_index, which is an index of the development stage graph nodes with alterations to average time spent in the node and ordered rules if a node is deleted in the edits, as discussed above. The event stream alteration subsystem may also store a team_index, which includes team names and alterations of response times. The event stream alteration subsystem may also store a dev_unit_index, which is an index of work units to development stages with a time ordered list of changes C. The event stream alteration subsystem may also store a dev_edge_index, which is an index of {dev_current_node, dev_next_node} to a time ordered list of edge details specified by changes C.

The method 1000 begins at 1002, wherein the event stream alteration subsystem may read in an incoming graph description and stores the same in the dev_node_index. At 1004, the event stream alteration subsystem may read identity manager edits and store them in the team_index. At 1006, the event stream alteration subsystem may accept an incoming change C from a connector. The change C may describe which type of work unit is described by the change.

At 1008, the event stream alteration subsystem may determine whether the work unit U indicated by the change C is in the dev_unit_index. If the work unit U is not in the dev_unit_index, at 1010 the event stream alteration subsystem may determine whether the development graph node specified in the change C is marked as deleted in the dev_node_index. If the development graph node specified in the change C is marked as deleted in the dev_node_index, at 1012 the event stream alteration subsystem may determine the dev_current_node by applying ordered rules from the dev_node_index for the change C. Below are two non-limiting examples of rules, wherein C is a change that has arrived:

(1) the type of change C is "task" and the priority field in C is "high," then set the next development stage node (dev_current_node) as "test"; or (2) the type of C is "defect" and the priority field in C is "low," then set the next development stage node as null.

At 1014, the event stream alteration subsystem may then determine whether the dev_current_node is NULL. If the dev_current_node is NULL, control may return to act 1006. If the dev_current_node is not NULL, at 1016 the event stream alteration subsystem may use the change C to add the work unit and the dev_current_node into the dev_unit_index.

If the development graph node specified in the change C is not marked as deleted in the dev_node_index (i.e., act 1010=no), at 1018 the event stream alteration subsystem may set the dev_current_node to the development graph node specified in the change C. Then, at 1016, the event stream alteration subsystem may use the change C to add the work unit and the dev_current_node into the dev_unit_index, as discussed above.

At 1020, the event stream alteration subsystem may set the dev_next_node to the dev_current_node. At 1022, the event stream alteration subsystem may update the node weight of the dev_next_node with the change C and any alterations from the dev_node_index for the dev_next_node and may update the dev_unit_index for the work unit U with the dev_next_node and the change C.

If the work unit U is in the dev_unit_index (i.e., act 1008=yes), at 1024 the event stream alteration subsystem may set the dev_current_node to the development stage graph node recorded for the work unit U in the dev_unit_index. At 1026, the event stream alteration subsystem may determine whether the development stage graph node specified in the change C is marked as deleted in the dev_node_index. If the development stage graph node specified in the change C is marked as deleted in the dev_node_index, at 1028 the event stream alteration subsystem may determine whether the dev_next_node by applying ordered rules from the dev_node_index for the change C. At 1030, the event stream alteration subsystem may determine whether the dev_next_node is NULL. If the dev_next_node is NULL, control may return to act 1006. If the dev_next_node is not NULL, at 1022 the event stream alteration subsystem may update the node weight of the dev_next_node with the change C and any alterations from the dev_node_index for the dev_next_node and may update the dev_unit_index for the work unit U with the dev_next_node and the change C, as discussed above.

If the development stage graph node specified in the change C is not marked as deleted in the dev_node_index (i.e., act 1026=no), at 1032 the event stream alteration subsystem may set the dev_next_node to the development stage graph node specified in the change C. Then, at 1022, the event stream alteration subsystem may update the node weight of the dev_next_node with the change C and any alterations from the dev_node_index for the dev_next_node and may update the dev_unit_index for the work unit U with the dev_next_node and the change C, as discussed above.

At 1034, the event stream alteration subsystem may determine whether there is a dev_edge between the dev_current_node and the dev_next_node in the dev_edge_index. If there is a dev_edge between the dev_current_node and the dev_next_node in the dev_edge_index, at 1036 the event stream alteration subsystem may retrieve the edge ED from the dev_edge_index. At 1038, the event stream alteration subsystem may update the edge weight of the edge ED using the change C and any alteration of the team from the team_index and may update the dev_edge_index with the change C.

If there is not a dev_edge between the dev_current_node and the dev_next_node in the dev_edge_index (i.e., act 1034=no), at 1040 the event stream alteration subsystem may add an edge ED from the dev_current_node to the dev_next_node in the dev_edge_index. Then, at 1038, the event stream alteration subsystem may update the edge weight of the edge ED using the change C and any alteration of the team from the team_index and may update the dev_edge_index with the change C, as discussed above.

At 1042, the event stream alteration subsystem may write the event to the graph event stream, which includes parameters "stage," dev_current_node, dev_next_node, u.id, u.name, u.duration, and change C.

FIG. 11 is an example development stage value stream graph 1100 generated by an SDVSG generation system, such as the SDVSG generation system 100 discussed above. The graph 1100 may be presented to users to allow them to visualize the development stage value stream of a software development effort. The graph 1100 may additionally or alternatively be analyzed to determine one or more aspects of a software development effort. The graph 1100 includes three nodes 1102, 1104 and 1106 that each represent a different development stage of a software development process. In particular, the node 1102 represents a definition development stage, the node 1104 represents an implementation development stage, and the node 1106 represents a testing development stage. In this example, the edge metric is the average time that a work unit (e.g., feature, vulnerability, defect) spends in each stage. In at least some implementations, the node weight may not be used. For example, the node weight may be the self-edge weight that may be converted to a node weight in a post-processing step (not shown).

FIG. 12 is an example specialized software tool value stream graph 1200 generated by an SDVSG generation system, such as the SDVSG generation system 100 discussed above. The graph 1200 may be presented to users to allow them to visualize the specialized software tool value stream of a software development effort. The graph 1200 may additionally or alternatively be analyzed to determine one or more aspects of a software development effort. The graph 1200 includes four nodes 1202, 1204, 1206 and 1208 that each represent a different specialized software tool (e.g., tools 112 of FIG. 1) used in a software development process. In particular, the node 1202 represents a software tool X, the node 1204 represents a software tool Y, the node 1206 represents a software tool Z, and the node 1208 represents a software tool A. In this example, the node weight is the number of users of the tool, and the edge weight is the count of work units (e.g., features, vulnerabilities, defects) flowing through each of the tools X, Y, Z and A.

FIG. 13 is an example team value stream graph 1300 generated by an SDVSG generation system, such as the SDVSG generation system 100 discussed above. The graph 1300 may be presented to users to allow them to visualize the team value stream of a software development effort. The graph 1300 may additionally or alternatively be analyzed to determine one or more aspects of a software development effort. The graph 1300 includes three nodes 1302, 1304 and 1306 that each represent a different team (e.g., business analyst team, software development team, quality assurance team) of an organization involved in a software development process. In particular, the node 1302 represents a team A, the node 1304 represents a team B, and the node 1306 represents a team C. In this example, the node weight is not used, and the edge weight is the count of work units (e.g., features, vulnerabilities, defects) flowing through each of the teams A, B and C.

FIG. 14 shows a processor-based device 1404 suitable for implementing various embodiments described herein. Although not required, some portion of the embodiments will be described in the general context of processor-executable instructions or logic, such as program application modules, objects, or macros being executed by one or more processors. Those skilled in the relevant art will appreciate that the described embodiments, as well as other embodiments, can be practiced with various processor-based system configurations, including handheld devices, such as smartphones and tablet computers, wearable devices, multiprocessor systems, microprocessor-based or programmable consumer electronics, personal computers ("PCs"), network PCs, minicomputers, mainframe computers, and the like.

The processor-based device 1404 may, for example, take the form of a smartphone or tablet computer, which includes one or more processors 1406, a system memory 1408 and a system bus 1410 that couples various system components including the system memory 1408 to the processor(s) 1406. The processor-based device 1404 will at times be referred to in the singular herein, but this is not intended to limit the embodiments to a single system, since in certain embodiments, there will be more than one system or other networked computing device involved. Non-limiting examples of commercially available systems include, but are not limited to, ARM processors from a variety of manufactures, Core microprocessors from Intel Corporation, U.S.A., PowerPC microprocessor from IBM, Sparc microprocessors from Sun Microsystems, Inc., PA-RISC series microprocessors from Hewlett-Packard Company, 68xxx series microprocessors from Motorola Corporation.

The processor(s) 1406 may be any logic processing unit, such as one or more central processing units (CPUs), microprocessors, digital signal processors (DSPs), application-specific integrated circuits (ASICs), field programmable gate arrays (FPGAs), etc. Unless described otherwise, the construction and operation of the various blocks shown in FIG. 14 are of conventional design. As a result, such blocks need not be described in further detail herein, as they will be understood by those skilled in the relevant art.

The system bus 1410 can employ any known bus structures or architectures, including a memory bus with memory controller, a peripheral bus, and a local bus. The system memory 1408 includes read-only memory ("ROM") 1412 and random access memory ("RAM") 1414. A basic input/output system ("BIOS") 1416, which can form part of the ROM 1412, contains basic routines that help transfer information between elements within processor-based device 1404, such as during start-up. Some embodiments may employ separate buses for data, instructions and power.

The processor-based device 1404 may also include one or more solid state memories, for instance Flash memory or solid state drive (SSD) 1418, which provides nonvolatile storage of computer-readable instructions, data structures, program modules and other data for the processor-based device 1404. Although not depicted, the processor-based device 1404 can employ other nontransitory computer- or processor-readable media, for example a hard disk drive, an optical disk drive, or memory card media drive.

Program modules can be stored in the system memory 1408, such as an operating system 1430, one or more application programs 1432, other programs or modules 1434, drivers 1436 and program data 1438.

The application programs 1432 may, for example, include panning/scrolling 1432a. Such panning/scrolling logic may include, but is not limited to logic that determines when and/or where a pointer (e.g., finger, stylus, cursor) enters a user interface element that includes a region having a central portion and at least one margin. Such panning/scrolling logic may include, but is not limited to logic that determines a direction and a rate at which at least one element of the user interface element should appear to move, and causes updating of a display to cause the at least one element to appear to move in the determined direction at the determined rate. The panning/scrolling logic 1432a may, for example, be stored as one or more executable instructions. The panning/scrolling logic 1432a may include processor and/or machine executable logic or instructions to generate user interface objects using data that characterizes movement of a pointer, for example data from a touch-sensitive display or from a computer mouse or trackball, or other user interface device.

The system memory 1408 may also include communications programs 1440, for example a server and/or a Web client or browser for permitting the processor-based device 1404 to access and exchange data with other systems such as user computing systems, Web sites on the Internet, corporate intranets, or other networks as described below. The communications program 1440 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers and/or Web clients or browsers are commercially available such as those from Mozilla Corporation of California and Microsoft of Washington.

While shown in FIG. 14 as being stored in the system memory 1408, the operating system 1430, application programs 1432, other programs/modules 1434, drivers 1436, program data 1438 and server and/or browser 1440 can be stored on any other of a large variety of nontransitory processor-readable media (e.g., hard disk drive, optical disk drive, SSD and/or flash memory.

A user can enter commands and information via a pointer, for example through input devices such as a touch screen 1448 via a finger 1444a, stylus 1444b, or via a computer mouse or trackball 1444c which controls a cursor. Other input devices can include a microphone, joystick, game pad, tablet, scanner, biometric scanning device, etc. These and other input devices (i.e., "I/O devices") are connected to the processor(s) 1406 through an interface 1446 such as a touch-screen controller and/or a universal serial bus ("USB") interface that couples user input to the system bus 1410, although other interfaces such as a parallel port, a game port or a wireless interface or a serial port may be used. The touch screen 1448 can be coupled to the system bus 1410 via a video interface 1450, such as a video adapter to receive image data or image information for display via the touch screen 1448. Although not shown, the processor-based device 1404 can include other output devices, such as speakers, vibrator, haptic actuator or haptic engine, etc.

The processor-based device 104 operates in a networked environment using one or more of the logical connections to communicate with one or more remote computers, servers and/or devices via one or more communications channels, for example, one or more networks 1414a, 1414b. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks including telecommunications networks, cellular networks, paging networks, and other mobile networks.

When used in a networking environment, the processor-based device 1404 may include one or more network, wired or wireless communications interfaces 1452a, 1456 (e.g., network interface controllers, cellular radios, WI-FI radios, Bluetooth radios) for establishing communications over the network, for instance the Internet 1414a or cellular network.

In a networked environment, program modules, application programs, or data, or portions thereof, can be stored in a server computing system (not shown). Those skilled in the relevant art will recognize that the network connections shown in FIG. 14 are only some examples of ways of establishing communications between computers, and other connections may be used, including wirelessly.

For convenience, the processor(s) 1406, system memory 1408, and network and communications interfaces 1452*a*, 1456 are illustrated as communicably coupled to each other via the system bus 1410, thereby providing connectivity between the above-described components. In alternative embodiments of the processor-based device 1404, the above-described components may be communicably coupled in a different manner than illustrated in FIG. 14. For example, one or more of the above-described components may be directly coupled to other components, or may be coupled to each other, via intermediary components (not shown). In some embodiments, system bus 1410 is omitted and the components are coupled directly to each other using suitable connections.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A computer-implemented method, comprising:
   storing, on at least one non-transitory processor-readable storage medium, work unit data for a plurality of work units, the work units created and managed via a plurality of specialized software tools through a plurality of development stages by a plurality of teams of one or more individuals associated with an entity;
   autonomously monitoring, by the at least one processor, activities of the plurality of specialized software tools via a plurality of software connectors to the plurality of specialized software tools, each of the plurality of software connectors includes a mapping that describes how data entered into at least one of the specialized software tools affects particular work units stored in the at least one non-transitory processor-readable storage medium;
   autonomously receiving, by at least one processor, event data indicative of an event from at least one of the plurality of specialized software tools based at least in part on the monitored activities of the plurality of specialized software tools;
   autonomously generating, by the at least one processor, an event stream based at least in part on the received event data, the event stream indicative of an effect, if any, that the event has on each of a plurality of value stream perspectives, wherein the plurality of value stream perspectives comprises a development stage value stream perspective, a team value stream perspective, and a tool value stream perspective; and
   autonomously generating, by the at least one processor, a software delivery value stream graph for at least one of the plurality of value stream perspectives based at least in part on the generated event stream, wherein the software delivery value stream graph comprises a development stage value stream graph, a team value stream graph, or a tool value stream graph.

2. The computer-implemented method of claim 1, further comprising: receiving, by the at least one processor, work unit data for a work unit from a user interface accessible by at least some of the individuals of the teams.

3. The computer-implemented method of claim 1, further comprising: autonomously receiving, by the at least one processor, work unit data for a work unit from a software connector operatively coupled to at least one of the plurality of specialized software tools.

4. The computer-implemented method of claim 1, further comprising: analyzing, by the at least one processor, the at least one generated software delivery value stream graph to determine at least one aspect of a software development process of the entity.

5. The computer-implemented method of claim 1, further comprising:
   causing, by the at least one processor, a graphical visualization of the at least one generated software delivery value stream graph on a display device.

6. The computer-implemented method of claim 1 wherein storing work unit data for a plurality of work units comprises storing work unit data for a plurality of features, defects, or vulnerabilities of a software program.

7. The computer-implemented method of claim 1 wherein autonomously generating a software delivery value stream graph comprises autonomously generating a development stage value stream graph that comprises a node- and edge-weighted directed graph, each of the nodes representing a different one of the plurality of development stages.

8. The computer-implemented method of claim 1 wherein autonomously generating a software delivery value stream graph comprises autonomously generating a team value stream graph that comprises a node- and edge-weighted directed graph, each of the nodes representing a different one of the plurality of teams.

9. The computer-implemented method of claim 1 wherein autonomously generating a software delivery value stream graph comprises autonomously generating a tool value stream graph that comprises a node- and edge-weighted directed graph, each of the nodes representing a different one of the plurality of specialized software tools.

10. The computer-implemented method of claim 1 wherein autonomously generating a software delivery value stream graph comprises autonomously generating a node- and edge-weighted directed graph, and metrics for the nodes and weights of the software delivery value stream graph are dependent at least in part on the particular value stream perspective represented by the generated software delivery value stream graph.

11. The computer-implemented method of claim 1 wherein storing work unit data for a plurality of work units comprises storing, for each of the plurality of work units, a set of development stages that a particular work unit can pass through in a development stage value stream.

12. The computer-implemented method of claim 1 wherein autonomously generating an event stream comprises autonomously generating an event stream based at least in part on the received event data, the event stream includes an identification of a work unit affected by the event, a previous and current development stage of the work unit, a previous and current team working on the work unit, and a previous and current specialized software tool being used to perform an activity associated with the work unit.

13. The computer-implemented method of claim 12 wherein autonomously generating an event stream comprises autonomously generating an event stream based at least in part on the received event data, and the event stream includes data relating to changing data in at least one of the plurality of specialized software tools.

14. The computer-implemented method of claim 1, further comprising:
receiving, by the at least one processor, at least a portion of a generated event stream;
receiving, by the at least one processor, a list of edits to a development stage graph that corresponds to the at least a portion of the generated event stream;
receiving, by the at least one processor, a list of edits to team information that corresponds to the at least a portion of the generated event stream; and
generating, by the at least one processor, a new event stream based at least in part on the received at least a portion of the generated event stream, the list of edits to the development stage graph, and the list of edits to team information.

15. The computer-implemented method of claim 14, further comprising:
autonomously generating, by the at least one processor, a new software delivery value stream graph for at least one of the plurality of value stream perspectives based at least in part on the generated new event stream.

16. The computer-implemented method of claim 14 wherein receiving a list of edits to a development stage graph comprises receiving a list of edits that specifies at least one of:
an alteration of an amount of time spent in a development stage for a type of work unit; or
a removal of a node in the development stage graph, and a set of rules that describe for a given event whether a different development stage graph node should be substituted for the node specified to be removed.

17. A software delivery value stream graph (SDVSG) generation system, comprising:
at least one non-transitory processor-readable storage medium that stores at least one of processor-executable instructions or data; and
at least one processor communicatively coupled to the at least one non-transitory processor-readable storage medium, in operation, the at least one processor:
stores, on the at least one non-transitory processor-readable storage medium, work unit data for a plurality of work units, the work units created and managed via a plurality of specialized software tools through a plurality of development stages by a plurality of teams of one or more individuals associated with an entity;
autonomously monitors activities of the plurality of specialized software tools via a plurality of software connectors to the plurality of specialized software tools, wherein each of the plurality of software connectors includes a mapping that describes how data entered into at least one of the specialized software tools affects particular work units stored in the at least one non-transitory processor-readable storage medium;
autonomously receives event data indicative of an event from at least one of the plurality of specialized software tools based at least in part on the monitored activities of the plurality of specialized software tools;
autonomously generates an event stream based at least in part on the received event data, the event stream indicative of an effect, if any, that the event has on each of a plurality of value stream perspectives, wherein the plurality of value stream perspectives comprises a development stage value stream perspective, a team value stream perspective, and a tool value stream perspective; and
autonomously generates a software delivery value stream graph for at least one of the plurality of value stream perspectives based at least in part on the generated event stream, wherein the software delivery value stream graph comprises a development stage value stream graph, a team value stream graph, or a tool value stream graph.

18. The SDVSG generation system of claim 17 wherein the at least one processor:
receives work unit data for a work unit from a user interface accessible by at least some of the individuals of the teams.

19. The SDVSG generation system of claim 17 wherein the at least one processor:
autonomously receives work unit data for a work unit from a software connector operatively coupled to at least one of the plurality of specialized software tools.

20. The SDVSG generation system of claim 17 wherein the at least one processor:
analyzes the at least one generated software delivery value stream graph to determine at least one aspect of a software development process of the entity.

21. The SDVSG generation system of claim 17 wherein the at least one processor:
  causing a graphical visualization of the at least one generated software delivery value stream graph on a display device.

22. The SDVSG generation system of claim 17 wherein the plurality of work units comprises a plurality of features, defects, or vulnerabilities of a software program.

23. The SDVSG generation system of claim 17 wherein the software delivery value stream graph comprises a development stage value stream graph that comprises a node- and edge-weighted directed graph, each of the nodes representing a different one of the plurality of development stages.

24. The SDVSG generation system of claim 17 wherein the software delivery value stream graph comprises a team value stream graph that comprises a node- and edge-weighted directed graph, each of the nodes representing a different one of the plurality of teams.

25. The SDVSG generation system of claim 17 wherein the software delivery value stream graph comprises a tool value stream graph that comprises a node- and edge-weighted directed graph, each of the nodes representing a different one of the plurality of specialized software tools.

26. The SDVSG generation system of claim 17 wherein the software delivery value stream graph comprises a node- and edge-weighted directed graph, and metrics for the nodes and weights of the software delivery value stream graph are dependent at least in part on the particular value stream perspective represented by the generated software delivery value stream graph.

27. The SDVSG generation system of claim 17 wherein the work unit data for a plurality of work units comprises, for each of the plurality of work units, a set of development stages that a particular work unit can pass through in a development stage value stream.

28. The SDVSG generation system of claim 17 wherein the event stream includes an identification of a work unit affected by the event, a previous and current development stage of the work unit, a previous and current team working on the work unit, and a previous and current specialized software tool being used to perform an activity associated with the work unit.

29. The SDVSG generation system of claim 28 wherein the event stream includes data relating to changing data in at least one of the plurality of specialized software tools.

30. The SDVSG generation system of claim 17 wherein the at least one processor:
  receives at least a portion of a generated event stream;
  receives a list of edits to a development stage graph that corresponds to the at least a portion of the generated event stream;
  receives a list of edits to team information that corresponds to the at least a portion of the generated event stream; and
  generates a new event stream based at least in part on the received at least a portion of the generated event stream, the list of edits to the development stage graph, and the list of edits to team information.

31. The SDVSG generation system of claim 30 wherein the at least one processor:
  autonomously generates a new software delivery value stream graph for at least one of the plurality of value stream perspectives based at least in part on the generated new event stream.

32. The SDVSG generation system of claim 30 wherein the list of edits specifies at least one of:
  an alteration of an amount of time spent in a development stage for a type of work unit; or a removal of a node in the development stage graph, and a set of rules that describe for a given event whether a different development stage graph node should be substituted for the node specified to be removed.

* * * * *